(12) United States Patent
Winnemoeller et al.

(10) Patent No.: US 9,202,309 B2
(45) Date of Patent: Dec. 1, 2015

(54) METHODS AND APPARATUS FOR DIGITAL STEREO DRAWING

(75) Inventors: Holger Winnemoeller, Seattle, WA (US); Yongjin Kim, Pohang (KR); Seungyong Lee, Pohang (KR)

(73) Assignee: Adobe Systems Incorporated, San Jose, CA (US)

( * ) Notice: Subject to any disclaimer, the term of this patent is extended or adjusted under 35 U.S.C. 154(b) by 675 days.

(21) Appl. No.: 13/562,630

(22) Filed: Jul. 31, 2012

(65) Prior Publication Data

US 2013/0057540 A1 Mar. 7, 2013

Related U.S. Application Data

(60) Provisional application No. 61/530,310, filed on Sep. 1, 2011.

(51) Int. Cl.
*G06T 15/00* (2011.01)
*G06T 15/80* (2011.01)
*G06T 19/20* (2011.01)

(52) U.S. Cl.
CPC .............. *G06T 15/80* (2013.01); *G06T 19/20* (2013.01); *G06T 2219/2021* (2013.01)

(58) Field of Classification Search
USPC ....................................................... 345/419
See application file for complete search history.

(56) References Cited

U.S. PATENT DOCUMENTS 6,268,865 B1 * 7/2001 Daniels et al. ................ 345/582
6,590,573 B1    7/2003 Geshwind 2008/0198168 A1 * 8/2008 Jiao et al. ...................... 345/506
2011/0292042 A1   12/2011 Vaganov
2012/0013613 A1 * 1/2012 Vesely ........................... 345/419

OTHER PUBLICATIONS

Bae, S.-H., Balakrishnan, R., and Singh, K. 2008. "Ilovesketch: as-naturalas-possible sketching system for creating 3d curve models". In Proceedings of the 21st annual ACM symposium on User interface software and technology, UIST '08, 151-160.
Bae, S.-H., Balakrishnan, R., and Singh, K. 2009. "Everybodylovessketch: 3d sketching for a broader audience". In Proceedings of the 22nd annual ACM symposium on User interface software and technology, ACM, New York, NY, USA, UIST '09, 59-68.
Baran, I., Schmid, J., Siegrist, T., Gross, M., and Sumner, R. W. 2011. "Mixed-order compositing for 3d paintings". ACM Trans. Graph. 30 (Dec.), 132:1-132:6.

(Continued)

*Primary Examiner* — Kimbinh T Nguyen
(74) *Attorney, Agent, or Firm* — Wolfe-SBMC

(57) ABSTRACT

Methods, apparatus, and computer-readable storage media for stereo drawing that enable the creation of stereoscopic image pairs. A stereo drawing system may present 3D shape (s) via a user interface (UI). The user can position and rotate a 3D shape, for example via direct manipulation technology such as motion tracking technology. A drawing surface may be mapped to an input device via which input strokes may be applied to the surface. The input strokes are mapped locally onto the surface, thereby allowing the user to draw onto a well-defined shape in 3D space. The stereo drawing system maps what is drawn onto the drawing surface; the geometry of the drawing surface provides depth information so that stereoscopic image pairs can be automatically generated.

20 Claims, 13 Drawing Sheets

(56) References Cited

OTHER PUBLICATIONS

Blythe, D. 2006. "The direct3d 10 system". ACM Trans. Graph. 25 (Jul.), 724-734. Cohen, J. M., Hughes, J. F., and Zeleznik, R. C. 2000. Harold: a world made of drawings. In Proceedings of the 1st international symposium on Non-photorealistic animation and rendering, NPAR '00, 83-90.

Cohen, J. M., Hughes, J. F., and Zeleznik, R. C. 2000. Harold: a world made of drawings. In Proceedings of the 1st international symposium on Non-photorealistic animation and rendering, NPAR '00, 83-90.

Didyk, P., Ritschel, T., Eisemann, E., Myszkowski, K., and Seidel, H.-P. 2011. A perceptual model for disparity. ACM Transactions on Graphics (Proceedings SIGGRAPH 2011, Vancouver) 30, 4.

Dorsey, J., Xu, S., Smedresman, G., Rushmeier, H., and McMillan, L. 2007. The mental canvas: A tool for conceptual architectural design and analysis. In Proceedings of the 15th Pacific Conference on Computer Graphics and Applications, IEEE Computer Society, Washington, DC, USA, 201-210.

Everitt, C. 2001. Interactive order-independent transparency. White paper, nVIDIA 2, 6, 7.

Fischer, G. 1999. Domain-oriented design environments: Supporting individual and social creativity. Learning, 83-111.

Green, T. R. G., and Petre, M. 1996. Usability analysis of visual programming environments: A cognitive dimensions framework. Journal of Visual Languages and Computing 7, 2, 131-174.

Haeberli, P. 1990. Paint by numbers: abstract image representations. In Proceedings of the 17th annual conference on Computer graphics and interactive techniques, SIGGRAPH '90, 207-214.

Hanrahan, P., and Haeberli, P. 1990. DirectWYSIWYG painting and texturing on 3d shapes. In Proceedings of the 17th annual conference on Computer graphics and interactive techniques, SIGGRAPH '90, 215-223.

Heinzle, S., Greisen, P., Gallup, D., Chen, C., Saner, D., Smolic, A. 2011. Computational stereo camera system with programmable control loop. ACM Trans. Graph. 30, 4 (Aug.), 94:1-94:10.

Ward, B., Kang, S. B., and Bennett, E. P. 2011. Depth director: A system for adding depth to movies. IEEE Computer Graphics and Applications 31, 36-48.

Hoiem, D., Efros, A. A., and Hebert, M. 2005. Automatic photo pop-up. ACM Trans. Graph. 24 (Jul.), 577-584.

Horry, Y., Anjyo, K.-I., and Arai, K. 1997. Tour into the picture: using a spidery mesh interface to make animation from a single image. In Proceedings of the 24th annual conference on Computer graphics and interactive techniques, SIGGRAPH '97, 225-232.

Keefe, D. F., Feliz, D. A., Moscovich, T., Laidlaw, D. H., and Laviola, Jr., J. J. 2001. Cave painting: A fully immersive 3d artistic medium and interactive experience. In Proceedings of the 2001 symposium on Interactive 3D graphics, I3D '01, 85-93.

Kim, C. Hornung, A., Heinzle, S., Matusik, W., and Gross, M. 2011. Multi-perspective stereoscopy from light fields. ACM Trans. Graph. 30, 6 (Dec.), 190:1-190:10.

Kulik, A., Kunert, A., Beck, S., Reichel, R., Blach, R., Zink, A., and Froehlich, B. 2011. C1x6: a stereoscopic six-user displaC1x6: a stereoscopic six-user display for co-located collaboration in shared virtual environmentsy for co-located collaboration in shared virtual environments. ACM Trans. Graph. 30, 6 (Dec.), 188:1-188:12.

Lang, M., Hornung, A., Wang, O., Poulakos, S., Smolic, A., and Gross,M. 2010. Nonlinear disparity mapping for stereoscopic 3d. ACM Trans. Graph. 29 (July), 75:1-75:10.

Lo, W.-Y., Van Baar, J., Knaus, C., Zwicker, M., and Gross, M. 2010. Stereoscopic 3d copy & paste. ACM Trans. Graph. 29, 6 (Dec.), 147:1-147:10.

Oskam, T., Hornung, A., Bowles, H., Mitchell, K., and Gross, M. 2011. Oscam—optimized stereoscopic camera control for interactive 3d. ACM Trans. Graph. 30, 6 (Dec.), 189:1-189:8.

Pixologic, Zbrush starting guide, Jul. 2012. available at http://www.pixologic.com/zbrush/.

Resnick, M., Myers, B., Pausch, R., Nakakoji, K., Shneiderman, B.,Pausch, R., Selker, T., and Eisenberg, M. 2005. Design Principles for Tools to Support Creative Thinking. In Creativity Support Tools, 25-36.

Schmid, J., Senn, M. S., Gross, M., and Sumner, R. W. 2011. Overcoat: an implicit canvas for 3d painting. ACM Trans. Graph. 30 (Aug.), 28:1-28:10.

Smolic, A., Kauff, P., Knorr, S., Hornung, A., Kunter, M., Muller, M., and Lang, M. 2011. Three-Dimensional video postproduction and processing. Proceedings of the IEEE 99, 4 (Apr.), 607-625.

Stavrakis, E. 2008. Stereoscopic Non-Photorealistic Rendering. PhD thesis, Vienna University of Technology, Vienna, Austria.

Ventura, J., Diverdi, S., and Höllerer, T. 2009. A sketch-based interface for photo pop-up. In Proceedings of the 6th Eurographics Symposium on Sketch-Based Interfaces and Modeling, SBIM '09, 21-28.

\* cited by examiner

METHODS AND APPARATUS FOR DIGITAL STEREO DRAWING

PRIORITY INFORMATION

This application claims benefit of priority of U.S. Provisional Appl. No. 61/530,310, filed Sep. 1, 2011, which is hereby incorporated by reference in its entirety.

BACKGROUND

Stereoscopic Vision

FIG. 1 illustrates stereoscopic vision. Humans have two eyes, a left eye 110 and a right eye 120 separated by a horizontal distance. As a consequence of this separation, the two images that are projected onto the retinas of these eyes are slightly different, depending on the arrangement of elements in a scene being viewed. Image plane 130 depicts the two different image projections 140. If two objects, element A 160 and element B 170 are located at different depths 150 to an observer, then the horizontal separation of corresponding object points, known as disparity, varies with depth 150. The human brain is able to interpret the inverse of this process. By analyzing the disparity of corresponding object points in the images of the left eye 110 and right eye 120, the brain is able to fuse these images into a single coherent 3D scene with objects at different depths.

Stereoscopic Imagery

Despite being almost as old as photography itself, stereoscopic imagery is only recently being commoditized at a large scale. For example, stereoscopic movies are being produced and released, and stereo capture systems (such as video and still cameras) are becoming available for consumers. Such movies are commonly referred to by producers as "3D." While these systems allow capturing of the real world with stereoscopic image pairs, they do not provide opportunity for stereoscopic art creation, such as sketching, painting, or drawing.

Compared to monoscopic artwork, which only requires a single view, stereoscopic artwork requires two views, or one view along with depth information so that the disparities for the second view can be computed from that information. A problem of stereoscopic art creation can therefore be stated as the problem of creating some artwork plus depth information.

Creation of stereo artwork (e.g. paintings, sketches, etc.) is difficult due to the necessity for stereo-consistent disparity information of the stereo pair. In the past, mechanical drawing devices have been designed that facilitate stereo sketching. However these mechanical drawing devices are complex to build and difficult to operate, as the user is required to draw free-hand in space. Furthermore, while such devices have been used to create some original stereoscopic artwork, there are several limitations associated with such physical devices, such as the volume covered by a device is spatially limited, physical marking devices cannot be guaranteed to be sufficiently similar to fuse two images into a stereographic image, and drawing implements are difficult to position in three dimensions.

Digital drawing techniques have been developed for generating a valid stereoscopic image pair. One such digital drawing technique is painting depth onto a 2D canvas. Given a digital painting, a user draws a corresponding depth image, where grayscale values correspond to depth values (e.g., lighter being closer to the viewer, and darker being further away). However, this technique includes the necessity of drawing an appropriate depth image, which is difficult, specifying absolute and relative values, accounting for occlusion boundaries, and drawing on a non-stereoscopic image. Another digital drawing technique is directly on a digital three-dimensional model. This approach requires a three-dimensional model of the scene to first be created, which can then be painted with different colors. As the step of creating such a three-dimensional scene can often be as or more time-consuming than creating a painting, this approach may generally be too time expensive for practical applications.

SUMMARY

Various embodiments of methods, apparatus, and computer-readable storage media for digital stereo drawing are described that enable the digital creation of stereoscopic artworks. Many of these digital artworks may be created entirely from a blank canvas utilizing embodiments of the present invention. Embodiments of digital stereo drawing techniques may be implemented as or in a stereo drawing system that may display three-dimensional (3D) shapes to a user through a user interface (UI). These 3D shapes may, for example, be used as proxies to provide depth information and may exhibit a wide range of curvature features, including but not limited to, planar, positive curvature, negative curvature, and saddle points. In at least some embodiments, a user can position and orient a displayed 3D shape in the drawing space with the use of a direct manipulation device, which may, for example, be a handheld device such as a smart phone or game controller that includes accelerometer and gyroscope technology, a space mouse, a visual tracking system, or an electromagnetic tracking system.

Some embodiments map a drawing surface of a 3D shape displayed on a display device to a drawing input device. In at least some embodiments, a drawing rectangle may be projected onto the center of the displayed 3D shape, which designates the mapped drawing surface that a user can manipulate. A drawing input device may include, but is not limited to, a touch-sensitive or multi-touch enabled device (e.g., a tablet computer or drawing pad) where a user may apply as input drawing strokes to a drawing surface. For example, by using one or more digits, a stylus, or other similar input method, or using a control device such as a mouse, a user may apply drawing strokes to a drawing surface. As the drawing surface of a 3D shape may be mapped to an input device, input drawing strokes are applied to the drawing surface of the 3D shape, thereby allowing the user to draw onto a well-defined shape in three-dimensional space. In some embodiments, the brightness of drawing strokes on a 3D shape may be modified corresponding to the shading characteristics of the 3D shape.

In at least some embodiments, the display of the 3D shape and user strokes may be displayed stereoscopically. The user may, but does not necessarily, use "3-D glasses" or some other device to view the stereoscopic image during or after creation. The user may use these techniques to interactively construct a stereoscopic image or artwork, while viewing his or her work interactively in real-time or near-real-time in stereoscopic form.

Embodiments may thus provide a user interface that allows a user to specify 3D shapes that are used to provide depth information for what the user draws. The stereo drawing system maps what is drawn by the user using an input device onto the geometry of the drawing surface; the geometry of the drawing surface provides depth information so that stereoscopic image pairs may be generated.

As this stereo drawing system is agnostic of the drawing tool (e.g., brush), embodiments may be used, for example, to create digital stereo drawings in many styles, including, but not limited to, pen-and-ink, chalk, pastel, watercolor, and oil.

Figure 1:
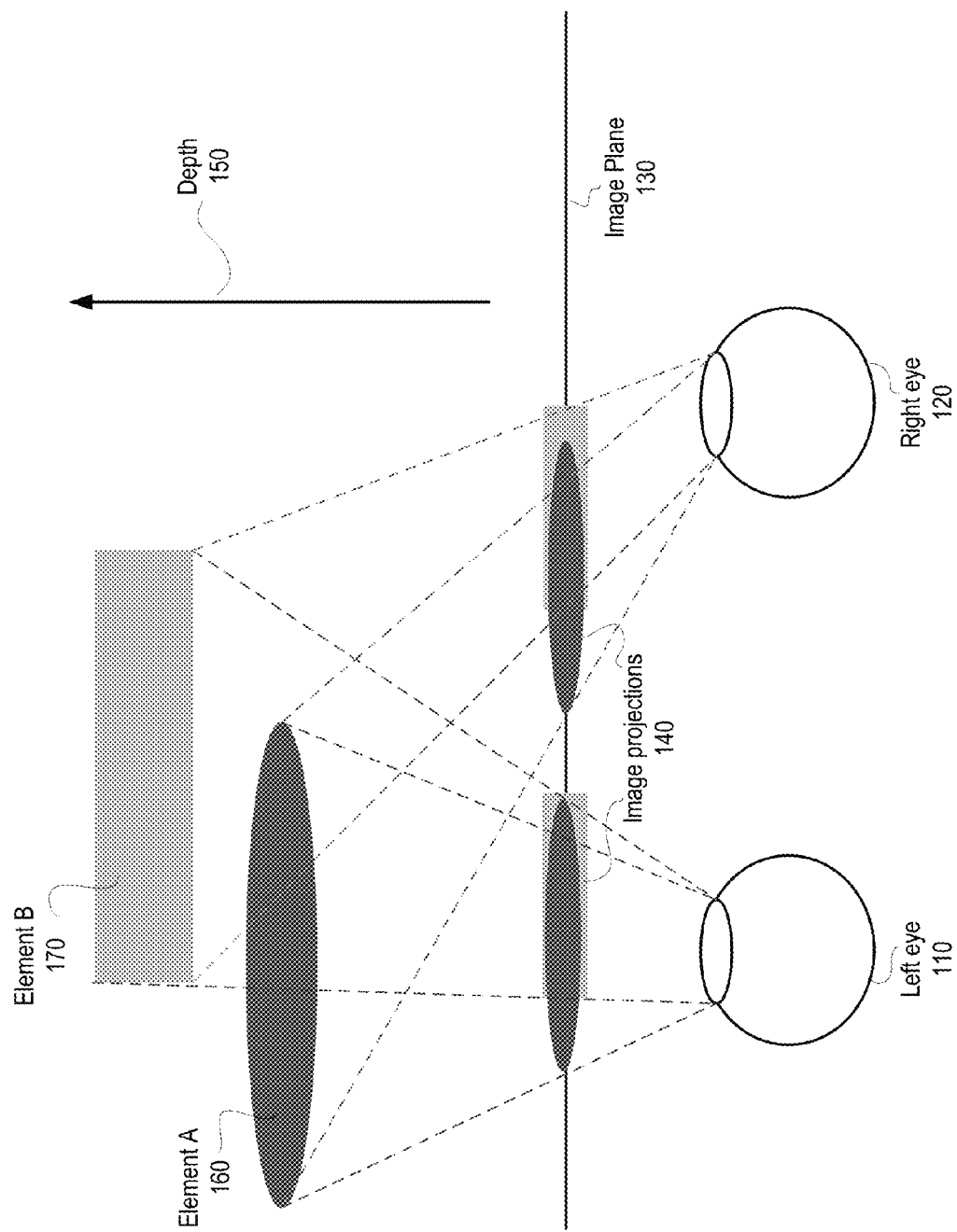
FIG. 1 illustrates stereoscopic vision.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Various embodiments of methods, systems, and apparatus for stereo drawing are described that enable the digital creation of stereoscopic artworks. Many of these digital artworks may be created entirely from a blank canvas utilizing embodiments of the present invention. In some embodiments, a user interface (UI) may be provided and underlying methods and techniques that allow a user to specify three-dimensional (3D) shape(s) that may, for example, be used as a proxies to provide depth information for what the user draws. The stereo drawing system maps what is drawn by the user using an input device onto the geometry of the drawing surface of a 3D shape, and the geometry of the drawing surface of the 3D shape provides depth information so that stereoscopic image pairs can be automatically generated.

Generally, depth information may only be needed for objects facing a viewer and objects not hidden by other objects. In addition, while stereo disparity, discussed above with regard to FIG. 1, is a necessary visual clue for stereoscopic fusion, it may not be a very high-fidelity depth cue for the human visual system. Therefore, the depth information of objects can be a rough approximation of the true geometry. Embodiments of digital stereo painting or drawing techniques as described herein may take advantage of this observation by allowing the user to build facades describing a scene and to paint on the facades, with the details of these facades being conveyed by the details painted on them.

Embodiments of the stereo drawing techniques as described herein may be implemented as or in a stereo drawing system that may present three-dimensional shape(s) to the user via a user interface (UI); the 3D shapes may exhibit a wide range of curvature features (planar, positive curvature, negative curvature, saddle points, etc.) In at least some embodiments, the user can position and rotate a displayed 3D shape in the drawing space with the use of a motion tracking device which may be, but is not necessarily, a handheld device such as a smart phone or game controller that includes accelerometer/gyroscope technology, and which may be, but is not necessarily, a wireless device. Other technologies that may be used for motion tracking include, but are not limited to, a space mouse, a visual tracking system, or an electromagnetic tracking system. A drawing rectangle may be projected onto the center of the displayed 3D shape, which defines the drawing region that the user can manipulate. This drawing region may be mapped to an input device (e.g., a touch- or multi-touch enabled device such as a tablet or pad), where the user applies the input strokes of the drawing to a surface of the 3D shape, for example using one or more digits, a stylus, or other similar input method, or using a control device such as a mouse. The input strokes are mapped locally onto the surface of the 3D shape, thereby allowing the user to draw onto a well-defined shape in 3D space. As this stereo drawing system is agnostic of the drawing tool (e.g., brush), embodiments may be used, for example, to create stereo drawings in many styles, including pen-and-ink, chalk, pastel, watercolor, and oil. In addition, the display of the 3D shape and user strokes may be displayed stereoscopically. The user may, but does not necessarily, use "3-D glasses" or some other device to view the stereoscopic image during or after creation. The user may use these techniques to interactively construct a stereoscopic image or artwork.

Embodiments of the digital stereo drawing techniques may be implemented in any application that supports multi-touch input on multi-touch-enabled or touch-sensitive devices to display one or more user interface elements respective to particular digits. An example category of application in which embodiments may be implemented are digital photograph adjustment, artistic, graphical design, and image processing applications, or more generally in applications in which the user may interact with a multi-touch-enabled device via a multi-touch-enabled application for artistic or other purposes. Embodiments of the digital stereo drawing techniques may, for example, be implemented as a module of an application, as a plug-in for applications including but not limited to artistic, graphical design, and image processing applications, and/or as a library function or functions that may be called by other applications including, but not limited to, artistic, graphical design, and image processing applications. Specific examples of applications or technologies in which embodiments may be implemented include, but are not limited to, Adobe® Photoshop® technology, Adobe® Flash® technology, Adobe® Illustrator® technology, and Adobe® After Effects® technology. "Adobe", "Photoshop", "Flash", "Illustrator", and "After Effects" are either registered trademarks or trademarks of Adobe Systems Incorporated in the United States and/or other countries.

Figure 16:
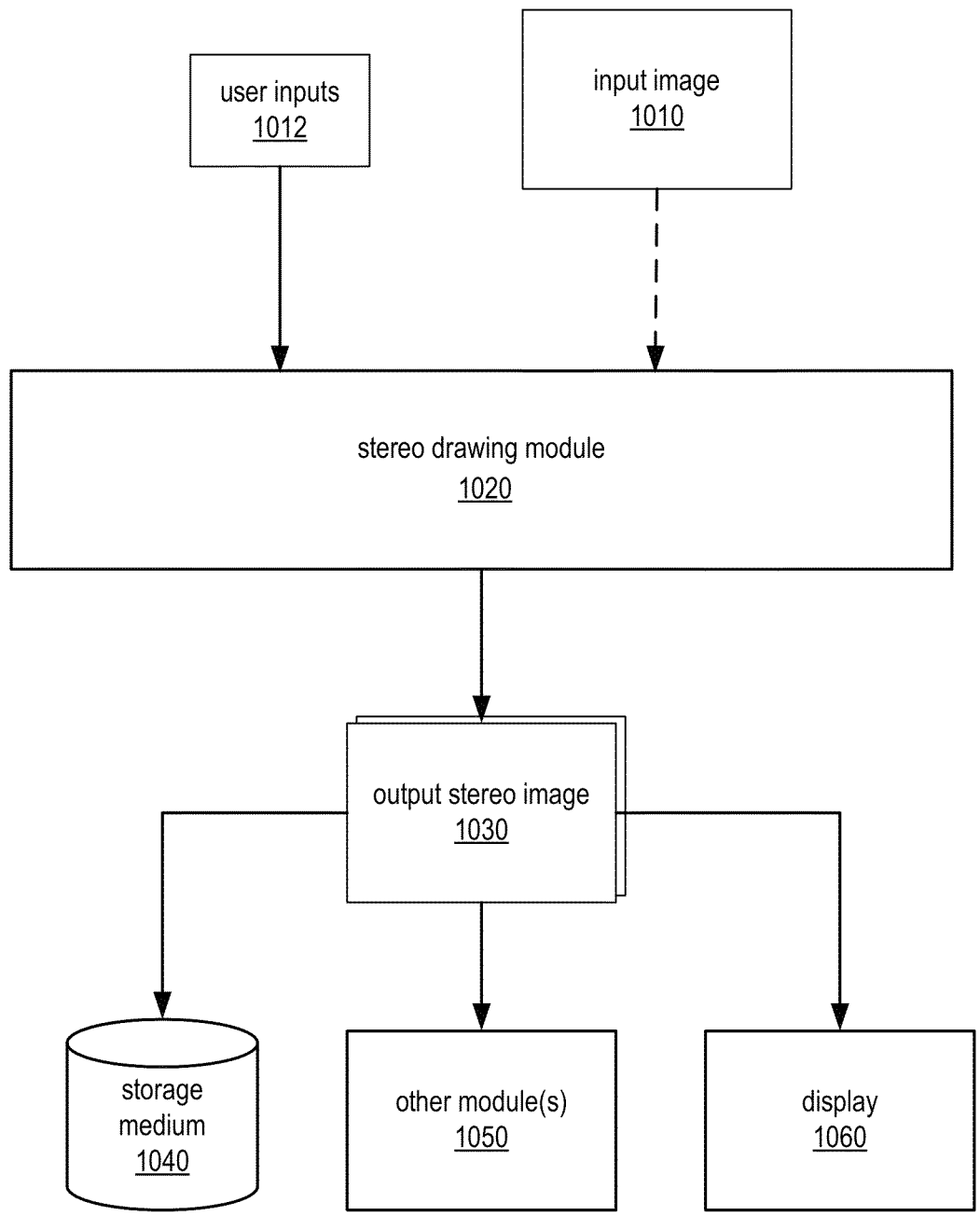
FIG. 16 illustrates a module that may implement embodiments of the stereo painting techniques as described herein, according to some embodiments.
Figure 17:
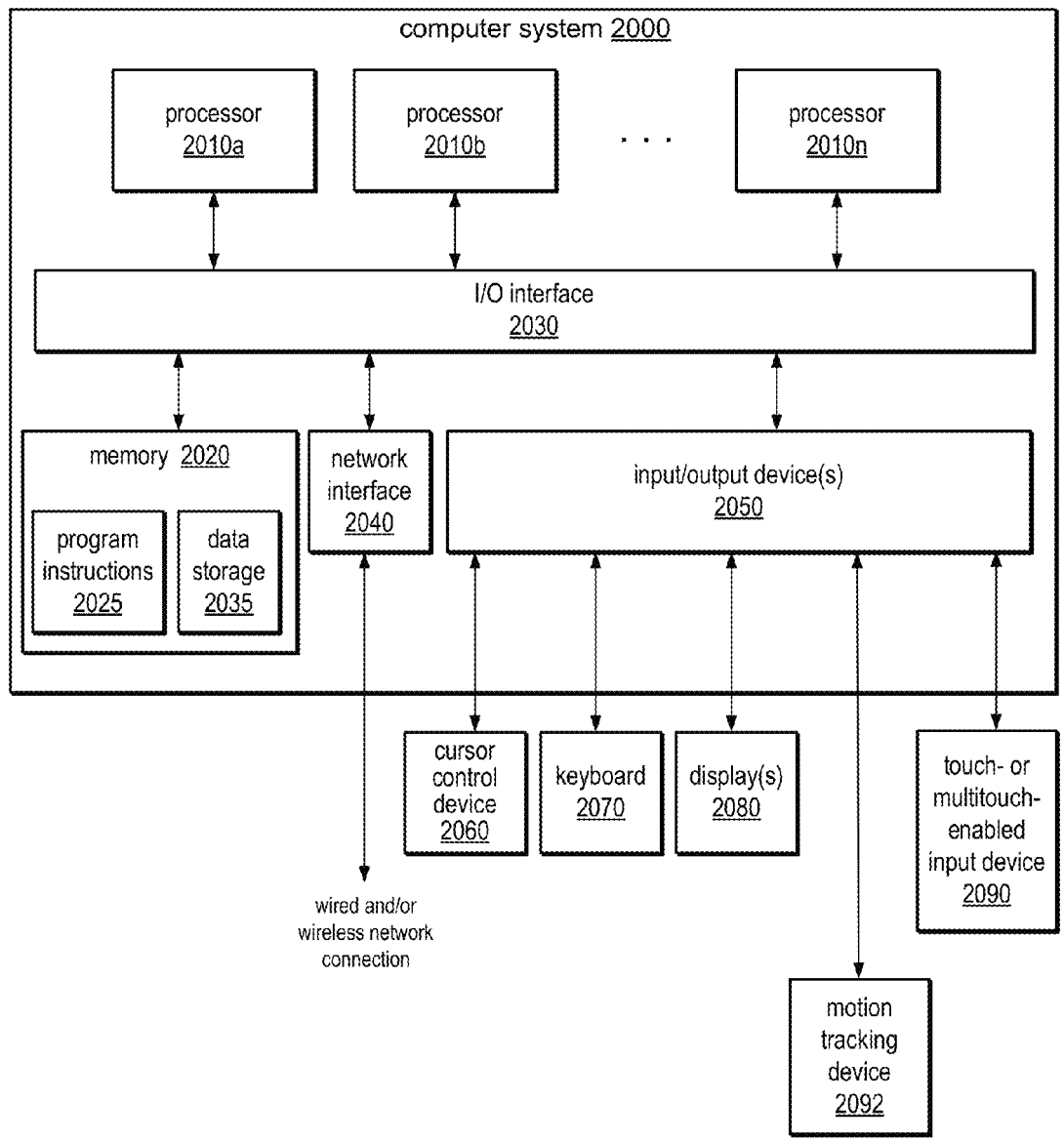
FIG. 17 illustrates an example computer system, according to some embodiments.

Embodiments of the digital stereo drawing techniques may be implemented and performed by a module or modules implemented by program instructions stored in a computer-readable storage medium and executable by one or more processors (e.g., one or more CPUs and/or GPUs). In some embodiments, at least some components of the digital stereo drawing techniques may be implemented on or in one or more graphics processing units (GPUs). An example module that may implement embodiments, and an example application that may implement the module, as described herein is illustrated in FIG. 16. An example computer system on which embodiments may be implemented is illustrated in FIG. 17.

Example Workflow Overview

The following describes an example workflow using an embodiment of the stereo drawing system as described herein. The user positions and orientates a 3D shape in a virtual space displayed on a user interface (UI) for the stereo drawing system. In at least some embodiments, the UI may be presented according to a stereo display technique; thus, the UI and the 3D shape may be displayed stereoscopically, and the user may, for example, use glasses or some other technique to view the UI and the 3D shape displayed therein. The geometry of the 3D shape is automatically logically mapped to an input device (e.g., a pad or tablet). User inputs to the input device (e.g., paint strokes applied to a surface of the 3D shape) appear in the virtual space at the correct position and depth according to the geometry of the 3D shape. The user may place and orientate one or more additional 3D shapes in the virtual space on the UI, and/or may reposition (e.g., move, rotate, etc.) one or more of the 3D shapes displayed on the UI. The user may continue to apply user inputs (e.g., paint strokes) to the surface(s) of the displayed 3D shape(s) to build paint plus depth until a satisfactory result is obtained. In at least some embodiments the brightness of inputs to the surface of a 3D shape may be automatically adjusted corresponding to calculated shading characteristics of the 3D shape according to positioned virtual lights. In at least some embodiments, output of this workflow is the two component images or views of a stereo image created according to the stereo painting technique.

Note that, in at least some embodiments, a user may also open a previously generated stereo painting to modify the stereo image, for example by modifying 3D shapes already in the artwork, by adding and painting on additional 3D shapes to the artwork, and/or by deleting portions of the artwork. In addition, in at least some embodiments, images or artwork created using other techniques may be opened, and the stereo drawing techniques may be used to edit those images.

The components of the stereo drawing system and the steps of the above workflow are explained in more detail in the following sections.

Example User Interface (UI)

Figure 2:
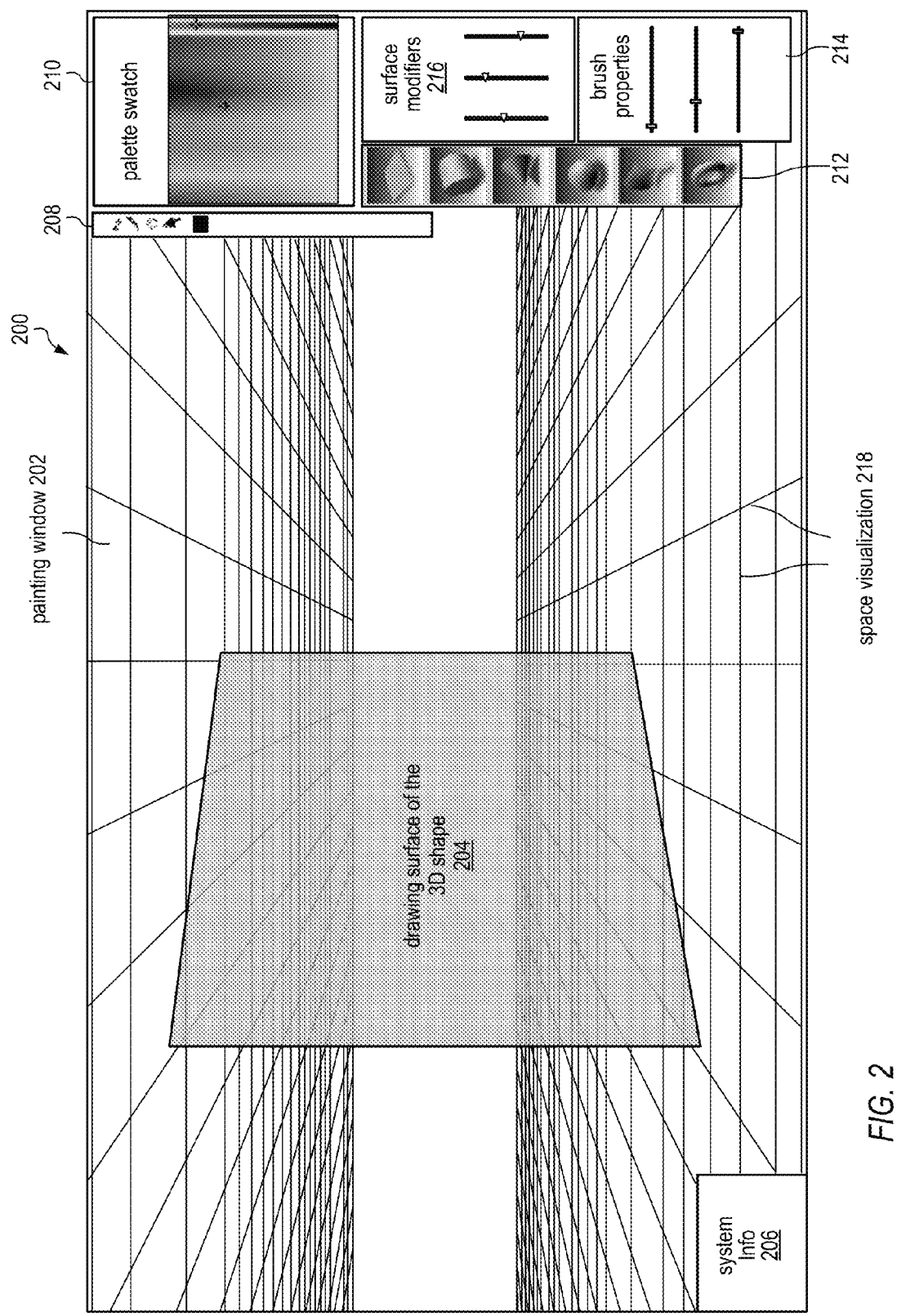
FIG. 2 illustrates an example user interface to the stereo drawing techniques, according to some embodiments.

FIG. 2 illustrates an example user interface (UI) 100 to the stereo painting or drawing techniques described herein according to at least some embodiments. The UI 200 illustrated in FIG. 2 should be seen as an example of various components that may be exposed to the user, and should not be interpreted as limiting. FIG. 16 illustrates an example module that may implement an embodiment of the stereo painting techniques including a user interface such as UI 200. FIG. 17 illustrates an example computer system on which embodiments of the stereo painting techniques may be implemented, and on which a user interface to the stereo painting techniques such as UI 200 may be displayed.

UI 200 may include a painting window 202. The painting window 202 is a display element that, for example, may display drawing surfaces, brush strokes, space visualization aids, and various other UI elements. The painting window 202 may be displayed to a user on a standard computer monitor, or on a stereoscopic display system or device.

UI 200 may display one or more drawing surfaces 204 in painting window 202. A drawing surface 204 may be a piece of geometry (in FIG. 2, a plane), onto which the user may draw brush strokes.

UI 200 may include a tool area 208 in which one or more user interface elements representing tools available to the user may be displayed. The tools may include, but are not limited to, one or more brush tools, one or more object manipulation tools, one or more scene manipulation tools, and one or more color picker tools.

UI 200 may include a surface modifier area 216 in which one or user interface elements (e.g., slider bars) representing surface modifiers are displayed. The surface modifier user interface elements may, for example, allow the user to non-uniformly (i.e., different per spatial axis) scale a drawing surface 204, to turn the visibility of a drawing surface 204 on or off, to invert the surface normals of a drawing surface 204, and/or to perform one or more other surface-modifying actions.

UI 200 may include a brush properties area 214 in which one or more user interface elements (e.g., slider bars) are displayed that allow the user to change one or more parameters of a brush used to apply strokes to the drawing surface 204. Brush properties may include one or more of, but are not limited to, brush size, transparency, texture, etc.

UI 200 may include a surface palette 212 that allows a user to select or specify a 3D shape to be used for the drawing surface 204. Note that the 3D shapes shown in surface palette 212 are given as examples, and are not intended to be limiting.

UI 200 may include a palette swatch 210 that may, for example, allow a user to select or modify a color to be applied with a brush, and/or to change the color of a previously applied stroke or strokes or of a selected drawing surface 204.

In some embodiments, UI 200 may display miscellaneous system information 206.

Figure 3:
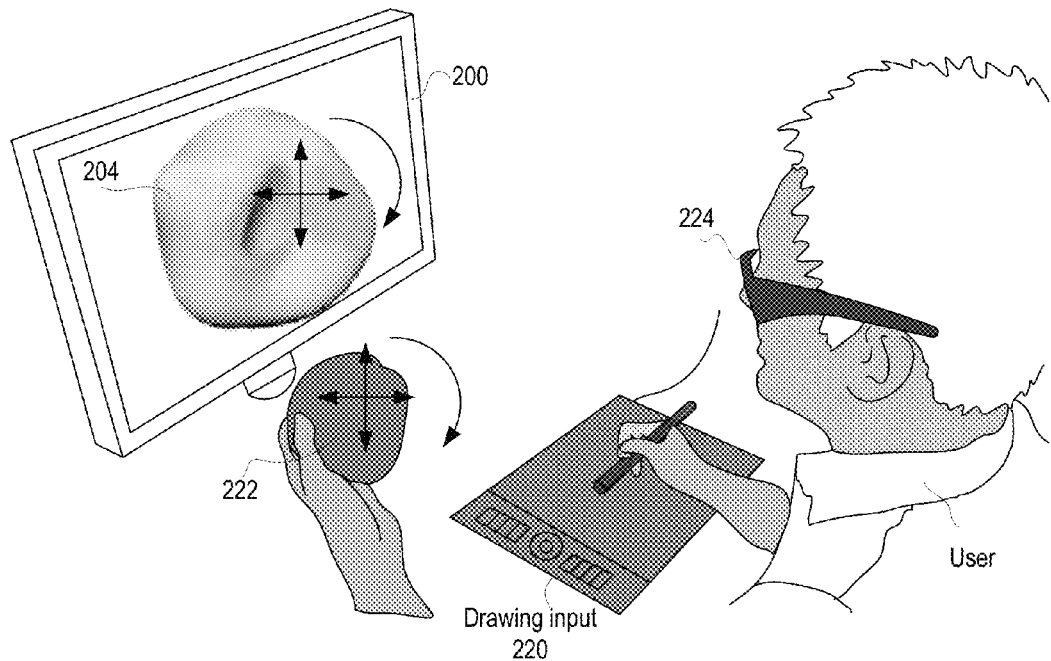
FIGS. 3 and 4 illustrate a user positioning, orientating, and drawing to a surface of a 3D shape, according to at least some embodiments.
Figure 4:
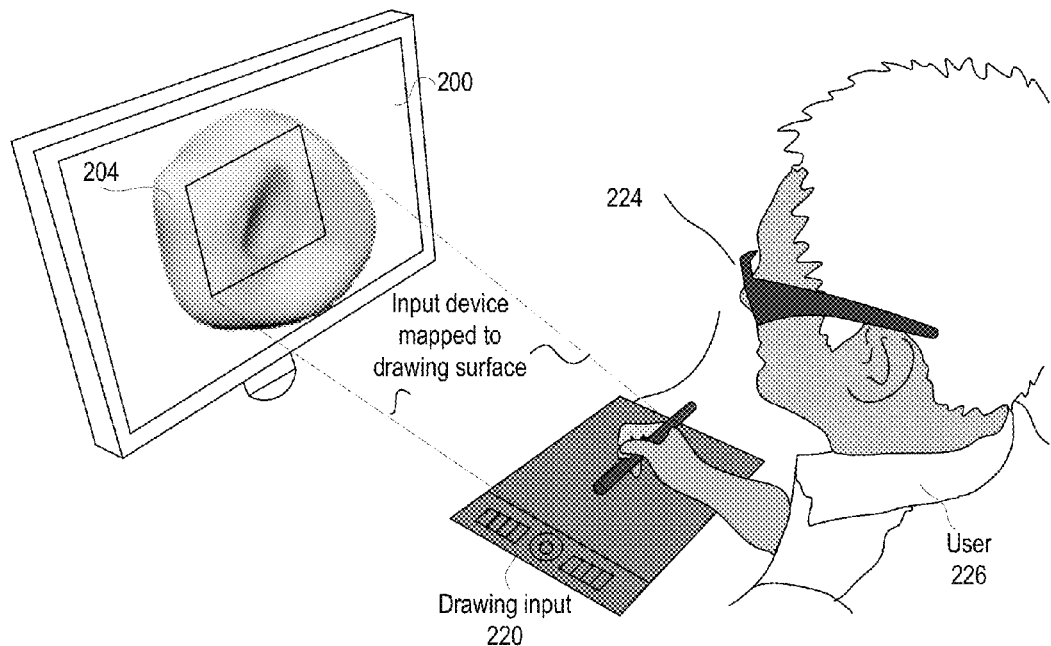

FIGS. 3 and 4 graphically illustrate a user interacting with the UI 200 displayed on a display device. These Figures are referred to in the following discussion.

Drawing Surface

In at least some embodiments, the user may perform, via the UI 200, the following steps one or more times to create a stereo image. The user selects a drawing surface 204, for example via a mouse click. The user may then position and orientate the surface 204 as necessary or desired via an input device, for example via a motion tracking device. FIG. 3 illustrates a user manipulating an example device 222 to position and orientate a surface 204 of a 3D shape, according to at least some embodiments. The drawing surface 204 of the 3D shape may be mapped to an input device 220, as shown in FIG. 4. In some embodiments, as shown in FIG. 4, a rectangular region of the displayed 3D object may be mapped to the surface of the input device 220. This drawing rectangle may correspond to what is referred to herein as a drawing surface. The user modifies and/or draws on the selected surface 204, for example via a touch- or multi-touch-enabled input device 220 as illustrated in FIGS. 3 and 4. In at least some embodiments, the user may interactively view the surface 204 and results of the manipulation and drawing input via stereo viewing technology such as 3D glasses 224 as shown in FIGS. 3 and 4.

Drawing Surface Selection

In at least some embodiments, a drawing surface 204 of a 3D shape may be selected from a variety of surfaces offered to the user via the surface palette 212. A drawing surface of a 3D shape may, in some embodiments, be only a portion of the surface of a 3D shape. Therefore, a portion of a drawing surface on a 3D shape may be a two-dimensional (2D) surface. For example, if "cylinder" is selected from a surface palette 212, the drawing surface may be either of the 2D flat ends of the cylinder or the curved surface of the cylinder. In at least some embodiments, the user may add new surfaces to the surface palette 212 for selection.

The surface 204 of a 3D shape that is selected should at least locally approximate the shape of the scene element to be drawn. It may be assumed that any geometry can be approximated locally using relatively simple geometry, e.g. a plane. However, many planes would have to be positioned and oriented to approximate the curved surface of e.g. a sphere. For at least that reason, at least some embodiments may provide multiple surface geometries of 3D shapes with various positive and negative curvatures, with saddle and inflexion points, and so on. The user may then select a surface 204 of a 3D shape from palette 212 that provides desired surface shape properties, and position the surface 204 to best approximate the local geometry of the shape to be drawn. Alternatively, in at least some embodiments the user may choose a surface 204 with a simple geometry such as a plane, position and orient the surface 204 as desired, and then modify the geometry of the surface 204 to add more shape complexity. This is discussed in more detail below.

Positioning and Orientating a Surface

Various embodiments or implementations of the stereo drawing system may provide one or more techniques for positioning and orientating a surface 204 in the virtual scene (painting window 202). In at least some embodiments, indirect manipulation techniques may be provided via which the user can use one or more input devices, such as keyboard and mouse, to move, scale, and rotate the drawing surface in the virtual space. In at least some embodiments, direct manipulation techniques may be provided. In a direct manipulation technique, using, for example, a six (6) degree-of-freedom input system (also referred to as a motion tracking system), the user can manipulate the orientation or position of a physical device in the real world, and have the orientation or position manipulations applied to the drawing surface 204 in the virtual world. FIG. 3 illustrates a user applying direct manipulation with an example handheld motion tracking device 222.

Any of various types of motion tracking systems or technologies may be used for direct manipulation in various embodiments or implementations of the stereo drawing system, including but not limited to space mouse technology, visual tracking technology, electromagnetic tracking technology, and devices such as smartphones or game/console controllers equipped with accelerometer/gyroscope motion tracking technology.

In at least some embodiments, the stereo drawing system may operate in two or more distinct modes, for example a shape positioning mode (see, e.g., FIG. 3) so that a user does not inadvertently draw to a surface 204 while moving or rotating a 3D shape, and a drawing mode (see, e.g., FIG. 4) so the drawing surface 204 is kept still when drawn on by the user. However, in at least some embodiments, the user may optionally choose to operate in a third mode in which the user may move a 3D shape (and thus the drawing surface 204), for example using a motion tracking device 222 as illustrated in FIG. 3, and provide drawing input to the drawing surface 204 of a 3D shape as illustrated in FIG. 4, at the same time.

Modifying and/or Drawing on a Selected Surface

In at least some embodiments, the stereo drawing system may include a drawing input device, such as a mouse, a pen and tablet, a pad device or display screen with touch- or multitouch technology, or similar. FIGS. 3 and 4 show an example input device 220, and are not intended to be limiting. The drawing input may be mapped logically onto the display screen, for example as shown in FIG. 4.

In at least some embodiments, in drawing mode, when the pointer or cursor of the drawing input device 220 is positioned over the drawing surface 204, the user may draw on the surface 204 with a currently selected brush or other drawing instrument. In at least some embodiments, when the pointer is positioned over other UI elements (see FIG. 2) the user may use the pointer to interact with those UI elements, instead.

In at least some embodiments, a sculpting mode may be provided in which user interactions carried out with the input device 220 may be interpreted to perform deformations to the surface 204. Deformation techniques that may be provided in embodiments may include one or more of, but are not limited to, push/Pull, bulge/pinch, drag, stretch, pin, and so on. These deformations may, for example be used to increase the complexity of a basic drawing surface 204 as desired, or to modify a more complex 3D shape.

Automatic Shading

Figure 5C:
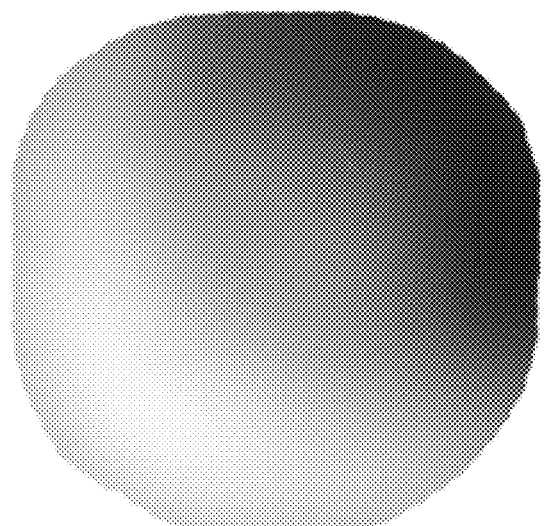
FIGS. 5A through 5C illustrate shading of an object.
Figure 5B:
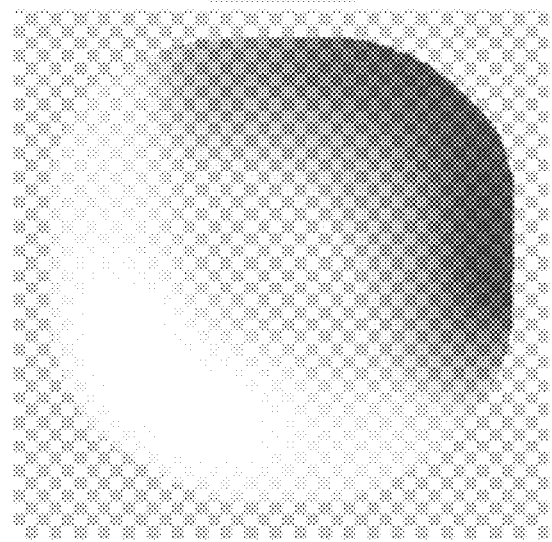
Figure 5A:
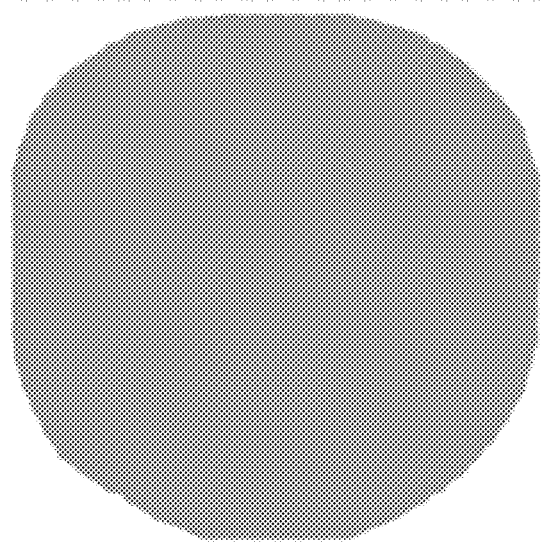

Drawing shading on an object or scene is generally non-trivial, and properly implementing shading generally requires understanding of how light interacts with surfaces. In a conventional shading technique, a user may apply shading to an object as follows. The user draws a base brightness (or color) for the object. The user then selects a large, feathered and transparent brush and draws light and dark shading onto the object. To achieve a smoother effect, the user may then blur the shading using some image processing technique. Overall, there are several steps involved in this process, and it requires a high degree of skill. FIGS. 5A through 5C illustrate this shading technique. FIG. 5A illustrates an object at base brightness. FIG. 5B illustrates painted shading. FIG. 5C illustrates the painted shading, blurred and applied to the base brightness.

Figure 6:
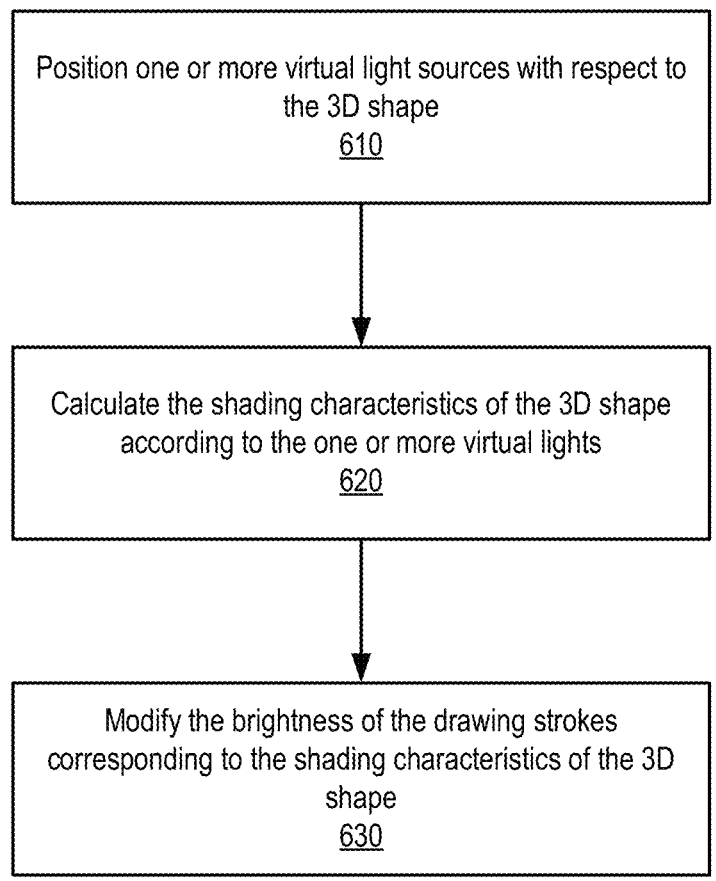
FIG. 6 illustrates a workflow of a method of automatically modifying the brightness of a given brush or other drawing instrument, according to some embodiments.

In at least some embodiments of the stereo painting system, given that the shapes have 3D surface geometry information and surface normals, the stereo painting system may provide an option to automatically modify the brightness of a given brush or other drawing instrument so that strokes applied with the drawing instrument adhere to the shading characteristics of the surface geometry. FIG. 6 illustrates a workflow of one such method of automatically modifying the brightness of a given brush or other drawing instrument. At least one or more virtual light sources may be positioned in desired locations of the 3D virtual scene 610. Using the virtual light information and surface geometries, shading characteristics (including highlights and shadows) can be calculated for a 3D shape according to the one or more virtual lights 620. Any of various shading techniques that use virtual light sources and surface geometry may be employed. As drawing strokes are applied to the 3D shape, the stereo drawing system may modify the brightness of the drawing strokes corresponding to the shading characteristics of the 3D shape 630.

Figure 7:
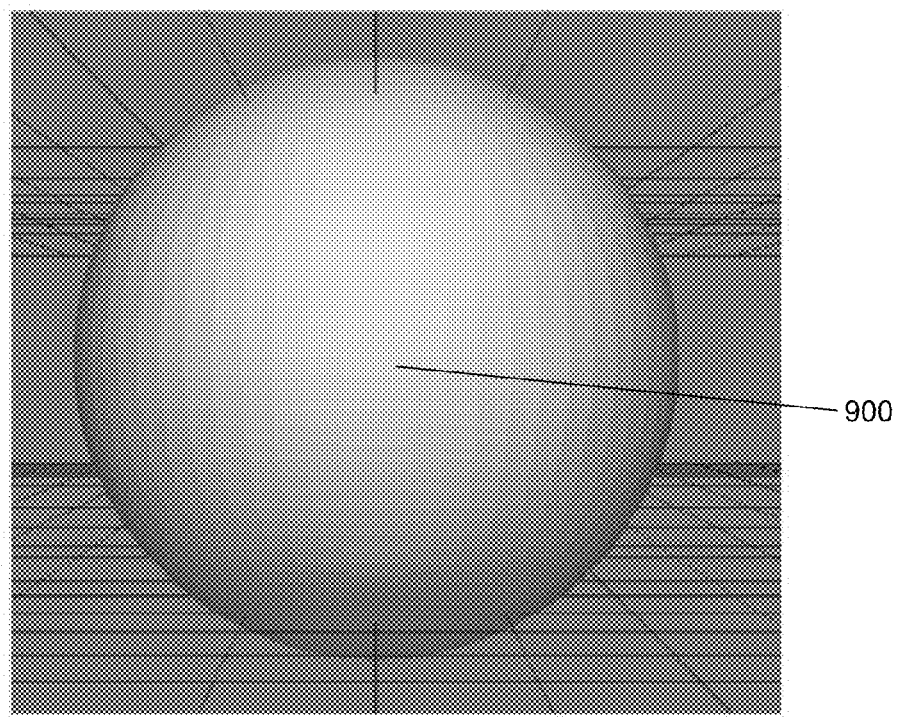
FIGS. 7 and 8 illustrate an automatic shading technique, according to some embodiments.
Figure 8:
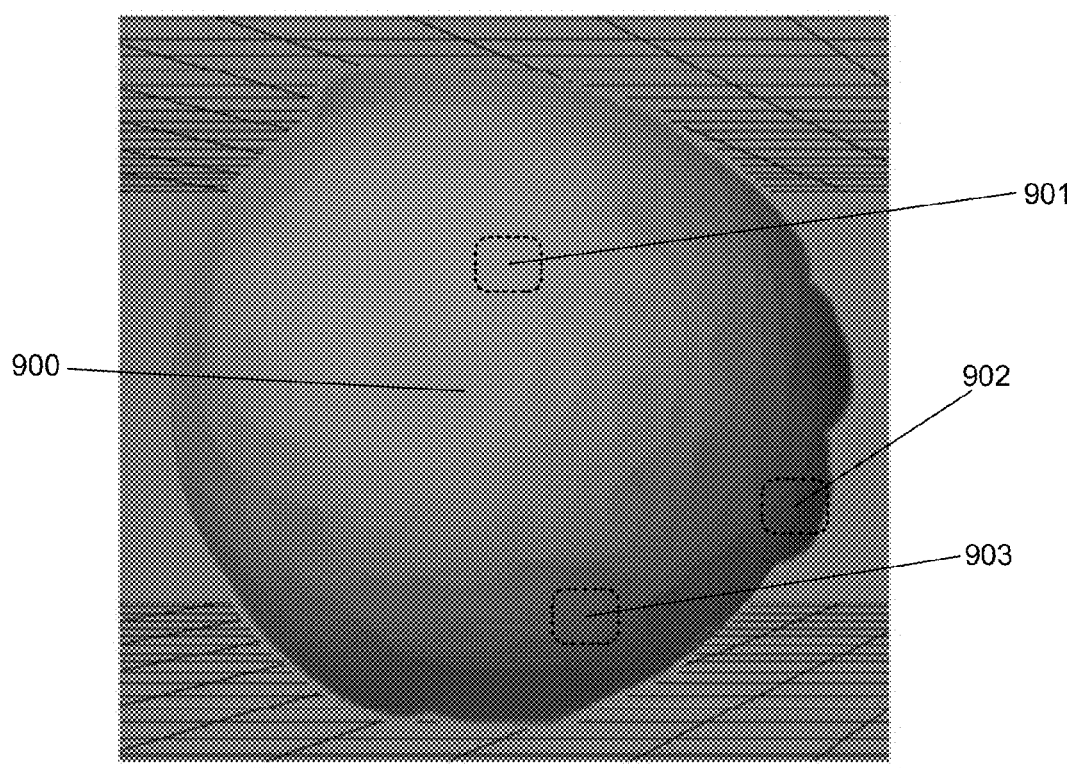

See, for example, FIGS. 7 and 8. In FIG. 7, the virtual lights may be positioned as to light the sphere 3D shape 900. In FIG. 7, the calculated highlight characteristics are focused on the center-front of the sphere shape 900 fading into the calculated shadow characteristics of the sphere shape 900 located on the left, right, and lower regions of the sphere shape 900. In FIG. 8, example drawing strokes 901-903 are applied to sphere shape 900. Drawing stroke 901 is applied toward the front-center of the sphere shape 900 and corresponds to the shading characteristics shown in FIG. 7. Drawing stroke 902 is applied on the right edge of the sphere shape 900 and reflects the shadow characteristic of the right edge of the sphere shape 900 in FIG. 7. Drawing stroke 903 is applied on the lower region of the sphere and reflects the shading characteristic of the sphere shape 900 in FIG. 7, with a blend of the highlight and shadow characteristics of the sphere shape 900. As exemplified in FIG. 8, this technique preserves the visual characteristic of brush strokes, yet adjusts the brightness of the brush's color to correspond to the shading of the underlying surface geometry.

Alternatively, in at least some embodiments, for each brush particle, in addition to storing depth information as obtained from the surface geometry, the normal of the surface where the brush particle was placed may be stored. This allows embodiments to re-light each brush dynamically, even after it has been drawn, by moving the virtual light-source around and computing its effect on the surface location that is represented by the brush particle.

Rendering Optimizations

Given that any specific stereo painting or drawing may consist of hundreds of thousands of strokes associated with different scene-depths and possibly partially transparent, there may be a significant rendering cost associated with displaying the stereo drawing to the user. Thus, at least some embodiments may implement one or more techniques for optimizing the rendering of stereo drawings during or after creation using the stereo drawing system to provide or improve real-time visual feedback to the user.

Brush Strokes

Figure 9:
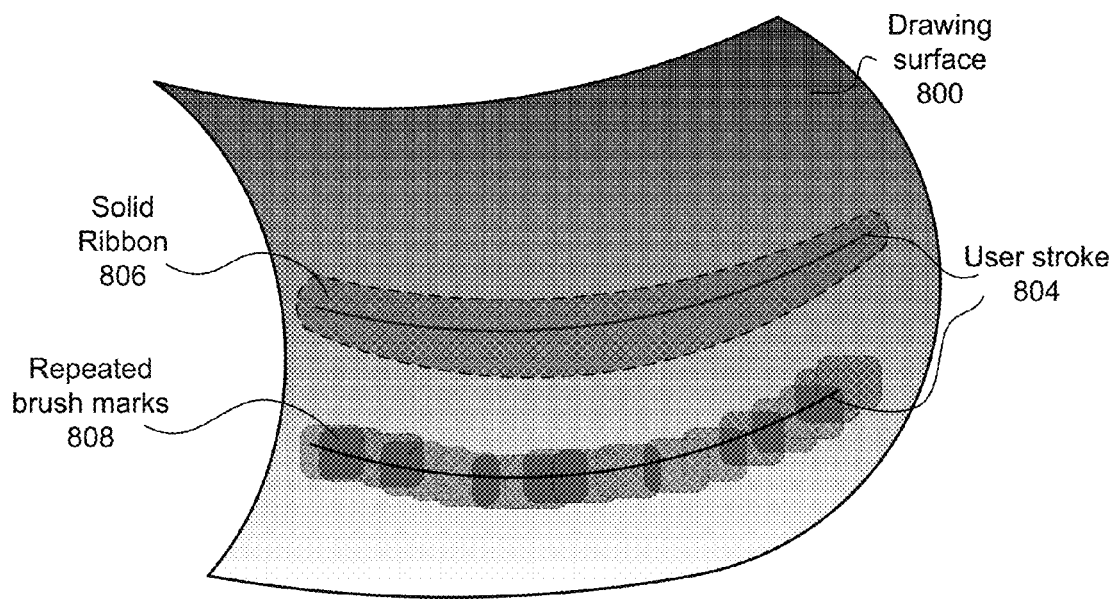
FIG. 9 illustrates an example drawing surface that shows user strokes as applied and expanded strokes, according to some embodiments.
Figure 10:
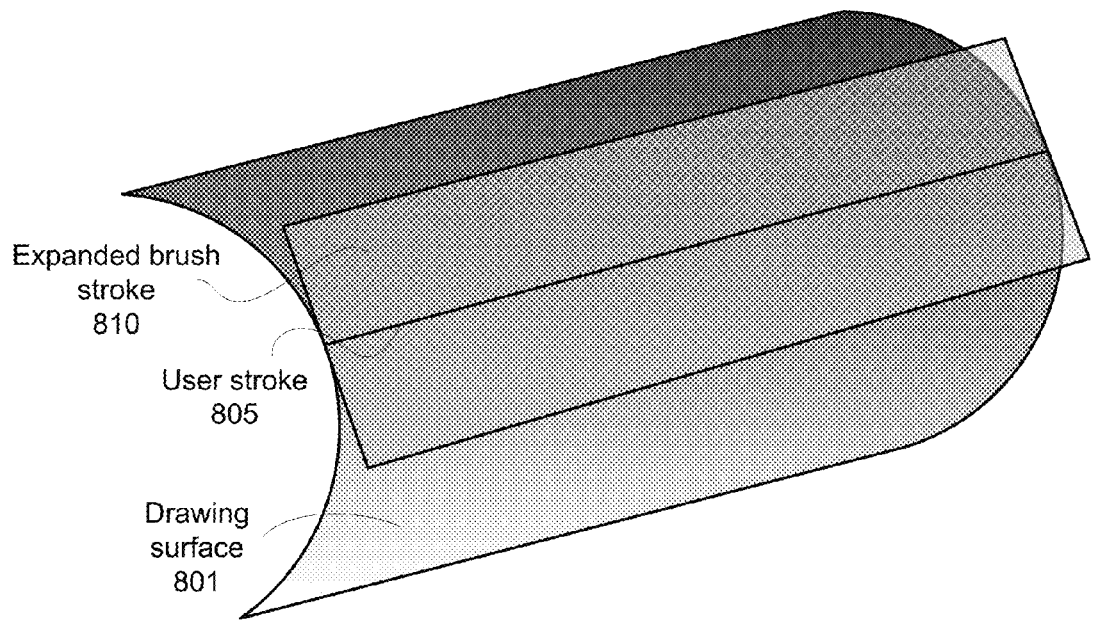
FIG. 10 illustrates an example case where a user stroke lies on the 3D shape surface, but the expanded brush stroke does not fully lie on the shape surface.
Figure 11:
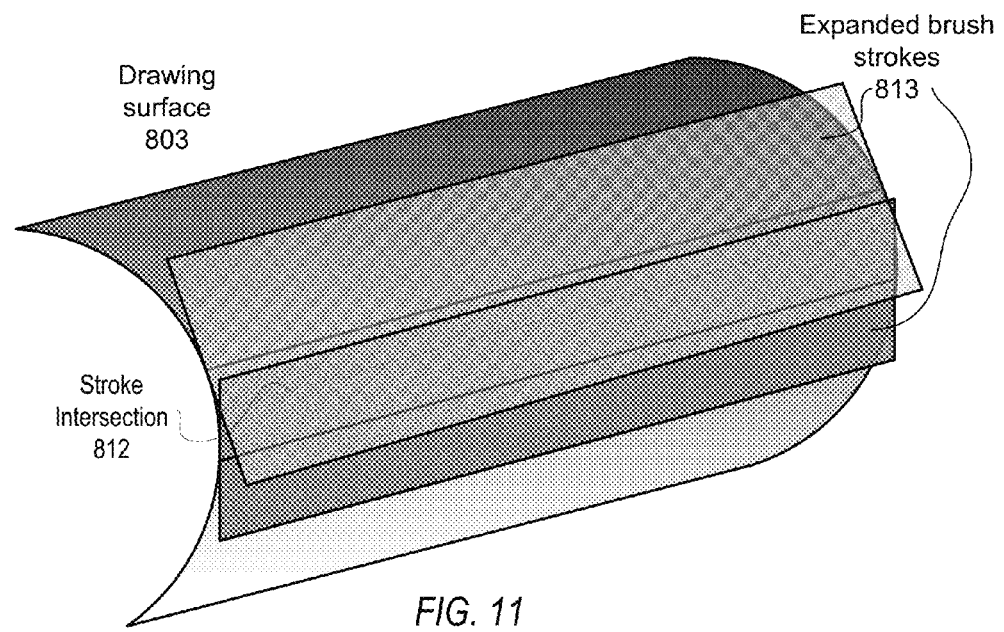
FIG. 11 illustrates an example case where multiple strokes are close to one another on the same surface and thus interact or intersect.

FIG. 9 illustrates a drawing surface 800 that shows user strokes as applied 804 (the lines) and expanded strokes (the shaded regions around the lines). The user's painting strokes can be associated with a drawing surface in a number of ways. In at least some embodiments, given a user input stroke and a drawing surface, the user stroke may be expanded into a brush stroke with a finite width, as shown by the expanded strokes in FIG. 9. This may be achieved, for example, by either placing a solid ribbon 806 of finite width around the user stroke (the top example in FIG. 9), or by placing repeated brush marks 808 or polygons of a certain width along the user stroke (the bottom example in FIG. 9). FIG. 10 demonstrates, that for either method of expanding a user stroke, there may be situations where the user stroke, as indicated at 805, itself lies on the drawing surface 801 of the 3D shape, but the expanded brush stroke 810 does not fully lie on the surface of the 3D shape. FIG. 11 illustrates the problematic result of multiple user strokes that do not fully lie on a surface of the 3D shape. Expanded brush strokes 813 do not fully lie on drawing surface 803 of the 3D shape. The expanded brush strokes 813 are so close to one another on the same surface 803 of the 3D shape that they intersect 812. As a result, two strokes that should have a well-defined depth-ordering instead are partially occluding one another.

Figure 12:
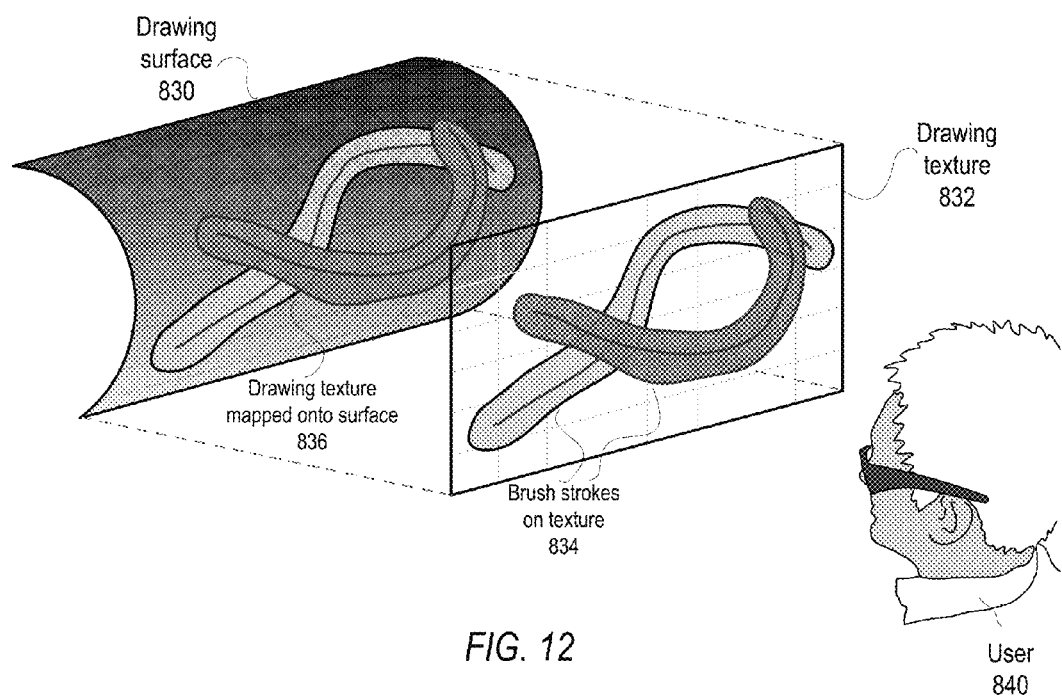
FIG. 12 illustrates a technique where strokes are drawn onto a texture that is then mapped onto the 3D shape, according to some embodiments.

To address this problem, in at least some embodiments, a new texture may be assigned to each 3D shape that is placed into the virtual scene. This technique is illustrated in FIG. 12. The user 840 may draw onto a new texture 832 assigned to the drawing shape surface 830 one or more brush strokes 834. The drawing texture 832 is mapped onto the drawing surface 836 of the 3D shape. In this way, a stereo drawing system may guarantee that all strokes a user draws lie exactly on the drawing surface and interact with one another in a predictable manner.

In at least some embodiments, the texture may be mapped onto the surface using simple projective texturing. However care must be taken when the surface of the 3D shape associated with the drawing texture is moved or rotated within the virtual space, because this may invalidate the relative positioning of strokes on the drawing texture. In at least some embodiments, in such a case, the raw stroke information (e.g., coordinates on the surface of the 3D shape) may be recorded in a data structure, and the drawing texture may be re-synthesized from the stored data after the surface of the 3D shape has been manipulated.

Alternatively, if a UV mapping of the surface of the 3D shape is known, the strokes that the user performs may be mapped into the UV space and will therefore stick to the surface of the 3D shape, even under manipulation.

3D Shape Geometry

The geometry of at least some 3D shapes may be relatively complex. In many cases, however, the brush strokes drawn by a user may only cover a small portion of the surface geometry. In such cases, it might be wasteful to render the entire surface geometry into the virtual scene. All that may be required is to render the geometry that is associated with brush strokes.

Figure 13:
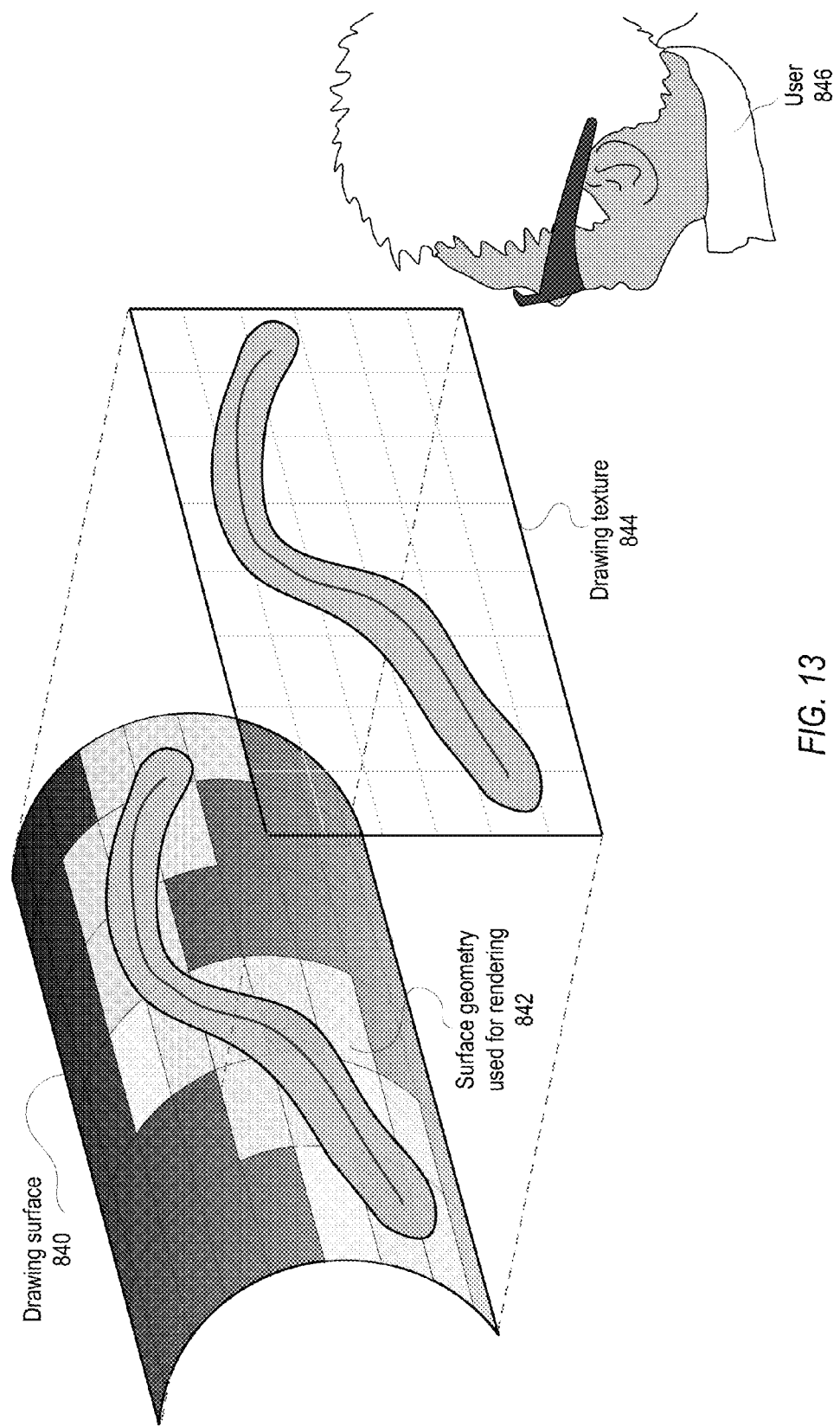
FIG. 13 illustrates a geometry indexing technique for rendering strokes, according to some embodiments.

FIG. 13 illustrates one possible method of rendering geometry associated with brush strokes. In some embodiments, rendering geometry associated with brush strokes may be efficiently implemented by storing an identifier (ID) of some regions or patches of the 3D shape surface used for rendering brush strokes. The 3D shape drawing surface 800 may be divided into regions, or patches (such as indicated by the rectangular grid lines on the drawing surface 840). A user 846 may draw a stroke on drawing texture 844 which is applied to the drawing surface 840 of the 3D shape. The surface geometry used for rendering 842 the drawing stroke may be identified according to the IDs of the surface patches touched by the drawing stroke (as indicated by the light colored rectangles at 842). If, for example an affine transformation, such as a translation, rotation, scaling, etc., is applied to the drawing surface 840, the rendering algorithm may just look for the identified patches of surface geometry used for rendering 842 and render them into the scene using the affine transformations for the drawing surface 840 of the 3D shape.

Figure 14:
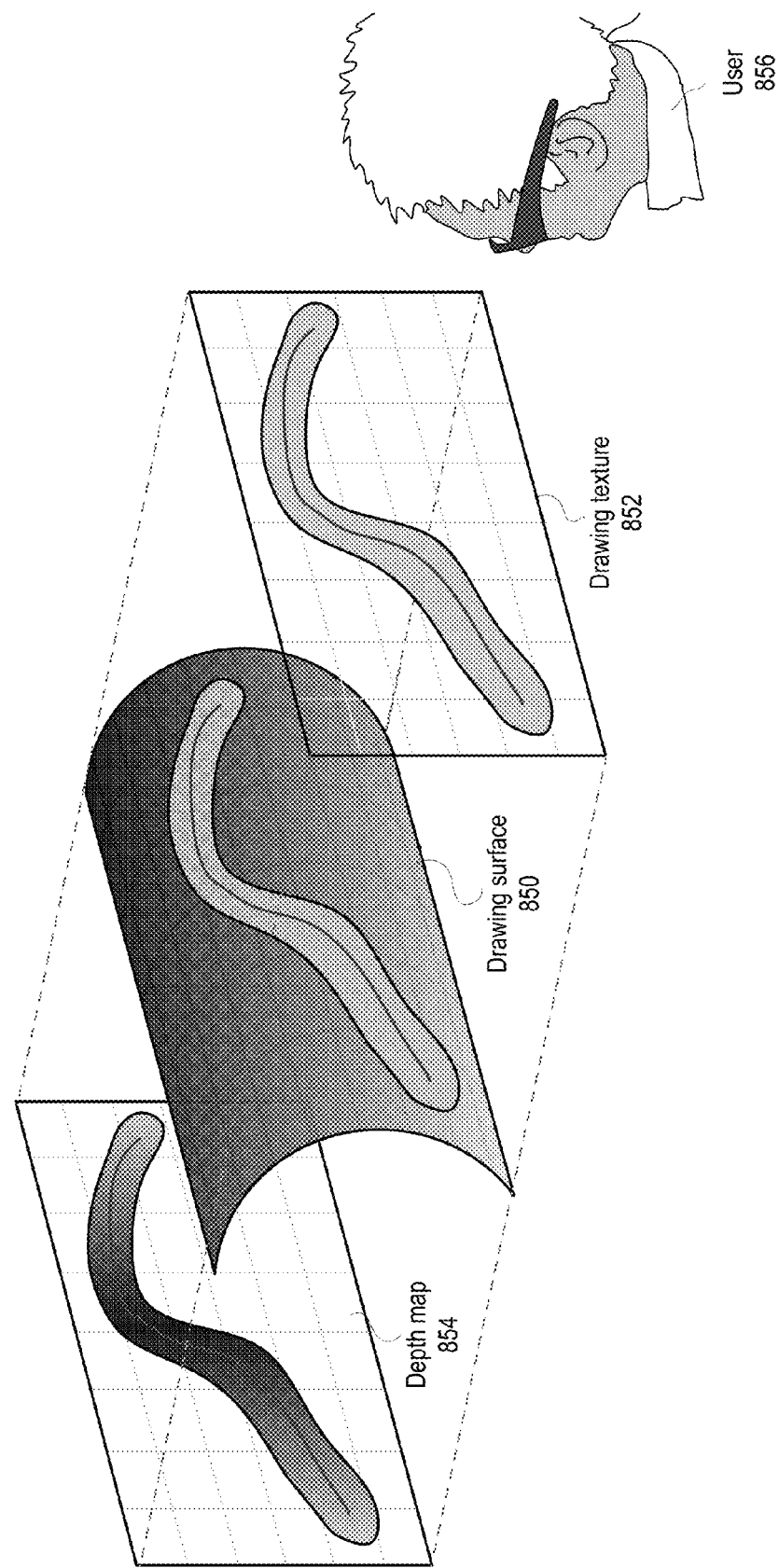
FIG. 14 illustrates a depth map technique for rendering strokes, according to some embodiments.

In at least some embodiments, as an alternative, an additional depth map may be computed, which corresponds to the depths of the drawing surface at those positions where the user has drawn a stroke. FIG. 14 illustrates an example of an additional depth that corresponds to the depths of the drawing surface at those positions where a user has drawn a stroke. A user 856 may input a drawing stroke on a drawing surface 850 of the 3D shape. The drawing stroke may be applied to the drawing surface 850 via a drawing texture 852. A stereo drawing system may compute and store in memory a depth map 854 of the texture 852 applied to the drawing surface 850. This depth-map 854, together with the drawing texture 852, can then be used to efficiently render the strokes of the drawing texture 852 into a virtual 3D scene. When applied, this technique limits the amount of geometry that may be necessarily rendered to the screen. In addition, computing a depth map does not require the identification of surface patches that have been touched by brush strokes.

When implementing some of the rendering optimizations discussed above, a particular technique may be chosen depending on the capabilities of the device and graphics hardware that the stereo painting system is deployed on. For hardware that is limited in the number of graphics primitives that can be displayed, the depth-map technique may be utilized. For hardware that is fill-rate limited, the geometry indexing technique may be utilized.

Note that other techniques for improving performance when rendering 3D shape geometry may be used instead of or in addition to the techniques described above in some embodiments.

Occluded Strokes

An opaque brush-stroke may hide one or more others strokes that are behind the stroke in depth-order. Even a sufficient number of semi-transparent strokes may hide some strokes that are behind them. Therefore, in at least some embodiments, a rendering optimization technique or techniques may be used to prevent the drawing of strokes that are hidden or occluded by other strokes.

In at least some embodiments, a per-surface compositing of strokes technique may be used to prevent the drawing of strokes that are hidden or occluded by other strokes. In this technique, all strokes associated with a given surface of a 3D shape may be rendered into a single texture and composited on-the-fly (i.e. maintaining only the composited result in the texture). For a single layer (the surface of a 3D geometry object), new strokes may be drawn on top of old strokes to allow for the user strokes to appear as adjustments to the current image. As such, it may be sufficient to only maintain two items: an image of all strokes drawn to date, and an image of the new stroke to be added. These two images may then be blended together to obtain the image-of-all-strokes for the next stroke.

In at least some embodiments, a depth-peeling technique may be used to prevent the drawing of strokes that are hidden or occluded by other strokes on different surfaces of 3D shapes. Various depth-peeling techniques are well-known to those of ordinary skill in the art, such as dual depth-peeling or multi-level depth peeling. By implementing depth-peeling techniques, a stereo drawing system may determine how many surfaces of 3D shapes (and their associated, composited transparencies) overlay any given region of the display in order to render strokes according to depth. The strokes on a single surface of a 3D shape may be drawn according their painting order. However, strokes on other surfaces of a 3D shape may be finally rendered by performing depth tests between the surface of a 3D shape and the other surfaces of other 3D shapes. If it is determined within any region that any additional surface rendered behind the existing surfaces would have a negligible effect on the final image, rendering of any additional surfaces in that region may not be performed.

At least some embodiments may employ both the per-surface compositing of strokes technique and the depth-peeling technique. In some embodiments, one or more other techniques may be used instead of or in addition to one or both of these described techniques.

Example Method of Stereo Drawing

Figure 15:
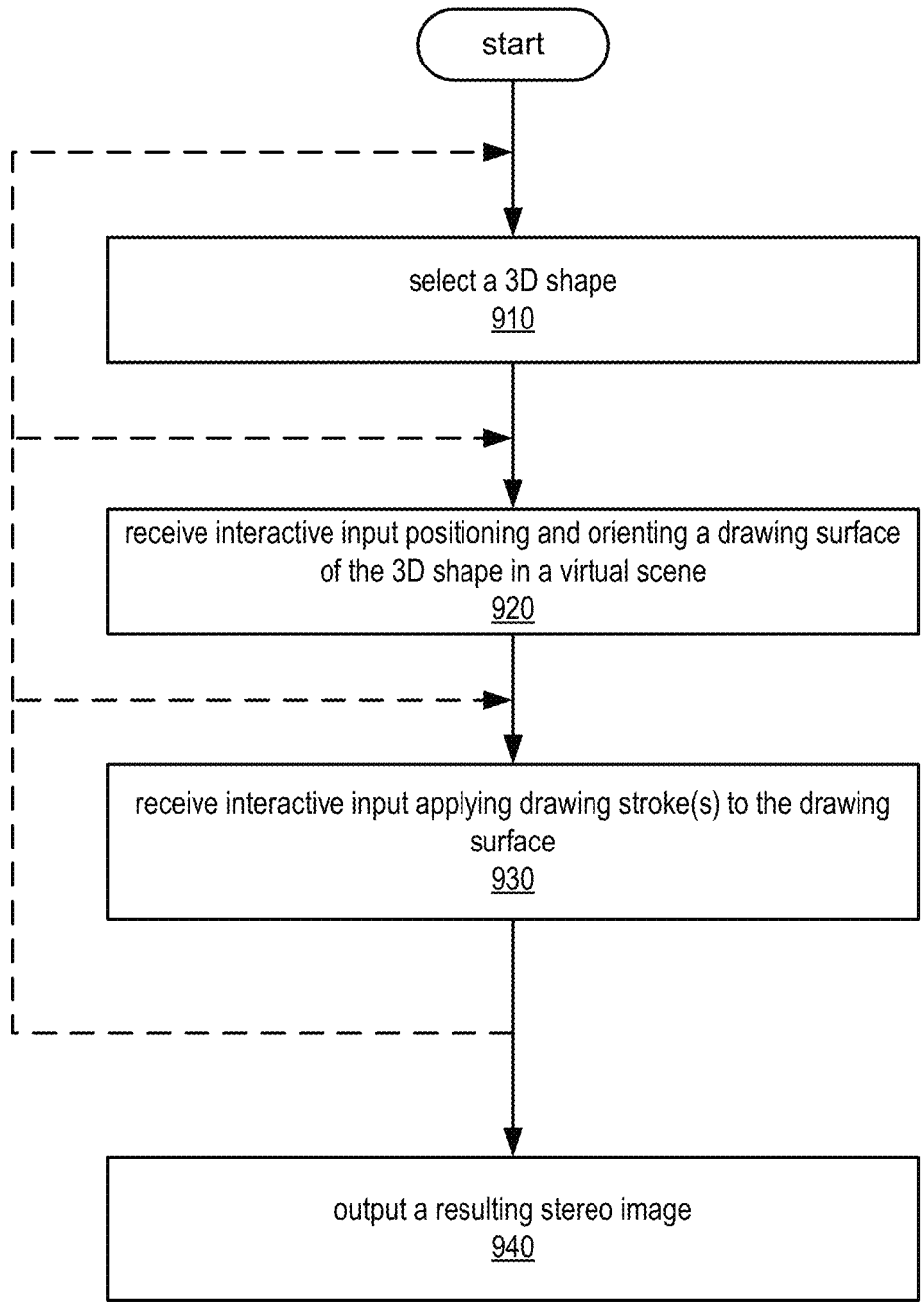
FIG. 15 is a high-level flowchart of a stereo painting method, according to some embodiments.

FIG. 15 illustrates a high-level flowchart of a method for stereo drawing, according to at least some embodiments. As indicated at 910, a user may select a 3D shape, for example via a surface palette 212 of a user interface (UI) 200 as shown in FIG. 2. As indicated at 920, interactive input positioning and orientating a drawing surface of the 3D shape in a virtual scene may be received, for example as illustrated in FIG. 3. In some embodiments, input(s) modifying the geometry of the surface may be received, for example via one or more surface modifiers 216 as shown in FIG. 2. Note that the geometry of the painting surface may be mapped to an input device used at 920. As indicated at 930, interactive input applying one or more strokes to the painting surface may be received, for example as illustrated in FIG. 4. Input may be received prior to or between strokes changing or modifying an instrument (e.g., a virtual brush) used to apply the strokes, for example via tools 208, palette swatch 210, and/or brush properties 214 as illustrated in FIG. 2.

After applying one or more strokes to the surface, the user may choose to change positioning and orientation of a surface as indicated at 920, and/or may choose to select an additional 3D shape as indicated at 910. As indicated by the dashed lines, a user may continue to apply user inputs (e.g., paint strokes) to the surface(s) of displayed 3D shape(s) to build paint plus depth until a satisfactory result is obtained.

As indicated at 940, output of this method may be a stereo image, or the two component images or views of a stereo image created according to the stereo painting technique. The output may, for example, be displayed, stored, and/or passed to one or more other modules for additional processing. In addition, the output may be further modified or edited by the method of FIG. 15, if necessary or desired.

While various techniques are described herein in the context of interactively drawing stereoscopic image pairs, the techniques may be applied to other image processing tasks. For example, the techniques may be applied as a modeling tool for creating 3D artwork. As another example, the techniques may be used to paint depth into a pre-existing 2D scene.

Example Implementations

Embodiments of the stereo drawing techniques as described herein may be used in any image editing or image processing application. Examples of applications in which embodiments may be used include, but are not limited to, Adobe® Photoshop®. "Adobe" and "Photoshop" are either registered trademarks or trademarks of Adobe Systems Incorporated in the United States and/or other countries. An example module that may implement the stereo drawing techniques is illustrated in FIG. 16. An example system on which such a module may be implemented is illustrated in FIG. 17.

Some embodiments may include a means for stereo image creation and editing using the stereo drawing techniques as described herein. For example, a module may be provided that may implement an embodiment of the stereo drawing techniques, for example as illustrated in FIGS. 2 through 15. The module may, for example, iteratively perform, via a user interface that may be displayed in stereoscopic mode: receiving input positioning and orientating a 3D shape in a virtual scene or painting window; mapping the geometry of the shape to an input device; and receiving input applying strokes to a painting surface of the 3D shape. The module may in some embodiments be implemented by a non-transitory, computer-readable storage medium and one or more processors (e.g., CPUs and/or GPUs) of a computing apparatus. The computer-readable storage medium may store program instructions executable by the one or more processors to cause the computing apparatus to perform the stereo drawing techniques as described herein, for example as illustrated in FIGS. 2 through 15. Other embodiments of the module may be at least partially implemented by hardware circuitry and/or firmware stored, for example, in a non-volatile memory.

FIG. 16 illustrates a module that may implement embodiments of the stereo drawing techniques as described herein. Stereo drawing module 1020 may, but does not necessarily receive an input image 1010 to which stereo content may be added or in which stereo content may be modified. The module 1020 may display a user interface, for example UI 200 as illustrated in FIG. 2, and may iteratively perform, via the user interface that may be displayed in stereoscopic mode: receiving input positioning and orientating a 3D shape in a virtual scene or painting window; mapping the geometry of the shape to an input device; and receiving input applying strokes to a painting surface of the 3D shape. Other actions may be performed by stereo drawing module 1020 as illustrated in and described for FIGS. 2 through 15. The module 1020 may generate as output an output stereo image 1030. Output image 1030 may, for example, be stored to a storage medium 1040, such as system memory, a disk drive, DVD, CD, etc., displayed on a display 1060, such as stereoscopic display, and/or passed to one or more other modules 1050 for further image processing. FIG. 17 illustrates an example computer system on which embodiments of module 1020 may be implemented.

Example System

Embodiments of the stereo drawing techniques as described herein may be executed on one or more computer systems, which may interact with various other devices. One such computer system is illustrated by FIG. 17. In different embodiments, computer system 2000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 2000 includes one or more processors 2010 coupled to a system memory 2020 via an input/output (I/O) interface 2030. Computer system 1000 further includes a network interface 2040 coupled to I/O interface 2030, and one or more input/output devices 2050, such as cursor control device 2060, keyboard 2070, and display(s) 2080. Display(s) 2080 may include standard computer monitor(s) and/or stereoscopic display systems or devices. In at least some implementations, the input/output devices 2050 may also include a touch- or multi-touch enabled device 2090 such as a pad or tablet via which a user enters input via a stylus-type device and/or one or more digits, and/or a motion tracking device 2092 such as an smart phone or game controller with accelerometer/gyroscope technology, a space mouse, a visual tracking system, or an electromagnetic tracking system. In some embodiments, it is contemplated that embodiments may be implemented using a single instance of computer system 2000, while in other embodiments multiple such systems, or multiple nodes making up computer system 2000, may be configured to host different portions or instances of embodiments. For example, in one embodiment some elements may be implemented via one or more nodes of computer system 2000 that are distinct from those nodes implementing other elements.

In various embodiments, computer system 2000 may be a uniprocessor system including one processor 2010, or a multiprocessor system including several processors 2010 (e.g., two, four, eight, or another suitable number). Processors 2010 may be any suitable processor capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

In some embodiments, at least one processor 2010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the stereo drawing techniques disclosed herein may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 2020 may be configured to store program instructions and/or data accessible by processor 2010. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for embodiments of the stereo drawing techniques as described herein are shown stored within system memory 2020 as program instructions 2025 and data storage 2035, respectively. In other embodiments, program instructions and/or data may be received, sent or stored upon different types of computer-accessible media or on similar media separate from system memory 2020 or computer system 2000. Generally speaking, a computer-accessible medium may include storage media or memory media such as magnetic or optical media, e.g., disk or CD/DVD-ROM coupled to computer system 2000 via I/O interface 2030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 2040.

In one embodiment, I/O interface 2030 may be configured to coordinate I/O traffic between processor 2010, system memory 2020, and any peripheral devices in the device, including network interface 2040 or other peripheral interfaces, such as input/output devices 2050. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. In addition, in some embodiments some or all of the functionality of I/O interface 2030, such as an interface to system memory 2020, may be incorporated directly into processor 2010.

Network interface 2040 may be configured to allow data to be exchanged between computer system 2000 and other devices attached to a network, such as other computer systems, or between nodes of computer system 2000. In various embodiments, network interface 2040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 2050 may, in some embodiments, include one or more display terminals, keyboards, keypads, touchpads, scanning devices, voice or optical recognition devices, or any other devices suitable for entering or retrieving data by one or more computer system 2000. Multiple input/output devices 2050 may be present in computer system 2000 or may be distributed on various nodes of computer system 2000. In some embodiments, similar input/output devices may be separate from computer system 2000 and may interact with one or more nodes of computer system 2000 through a wired or wireless connection, such as over network interface 2040.

As shown in FIG. 17, memory 2020 may include program instructions 2025, configured to implement embodiments of the stereo drawing techniques as described herein, and data storage 2035, comprising various data accessible by program instructions 2025. In one embodiment, program instructions 2025 may include software elements of embodiments of the stereo drawing techniques as described herein and as illustrated in the Figures. Data storage 2035 may include data that may be used in embodiments. In other embodiments, other or different software elements and data may be included.

Those skilled in the art will appreciate that computer system 2000 is merely illustrative and is not intended to limit the scope of the stereo drawing techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 2000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via intercomputer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 2000 may be transmitted to computer system 2000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A method, comprising:
   performing, by one or more computer devices:
      displaying, on a display device, a three-dimensional (3D) shape;
      translating a 3D drawing surface of the 3D shape to a two-dimensional (2D) representation of the 3D drawing surface based upon a geometry of the 3D drawing surface, the 3D drawing surface having an orientation that is independent of an orientation of the 3D shape;
      mapping the 2D representation to a drawing input device;
      receiving an input, on the drawing input device, indicating a drawing stroke relative to the 2D representation;
      converting the drawing stroke from the 2D representation to the 3D drawing surface according to the geometry of the 3D drawing surface; and
      generating a stereoscopic image pair according to the converted drawing stroke and depth information provided by the geometry of the 3D drawing surface.

2. The method as recited in claim 1, wherein the displaying the 3D shape is responsive to an input specifying the 3D shape.

3. The method as recited in claim 1, wherein the 3D shape and the converted drawing stroke are displayed on the display device in stereoscopic form.

4. The method as recited in claim 1, further comprising modifying at least one of the 3D shape's position or orientation in a virtual scene on the display device in response to a position or an orientation input.

5. The method as recited in claim 4, further comprising obtaining the position or the orientation input via a direct manipulation input device, the position or orientation input generated according to a position and an orientation of the direct manipulation input device.

6. The method as recited in claim 1, further comprising:
   obtaining an input specifying a modification to a geometry of the 3D drawing surface; and
   modifying the geometry of the 3D drawing surface according to the modification.

7. The method as recited in claim 1, further comprising:
   positioning a virtual light source with respect to the 3D shape; and
   calculating shading characteristics of the 3D shape according to the virtual light sources; and
   wherein said converting the drawing stroke comprises modifying a brightness of the drawing stroke according to the shading characteristics.

8. The method as recited in claim 1, further comprising storing indications of portions of the 3D drawing surface to which the drawing stroke is converted, and wherein said generating a stereoscopic image pair comprises rendering only the indicated portions of the drawing surface.

9. The method as recited in claim 1, further comprising creating a depth map that indicates a depth of the 3D drawing surface generated from a geometry of the 3D drawing surface at positions where the drawing stroke is applied, and wherein said generating a stereoscopic image pair comprises rendering the converted drawing stroke according to the depth map.

10. A system, comprising:
    at least one processor;
    a display device;
    a drawing input device; and
    a memory comprising program instructions, wherein the program instructions are executable by the at least one processor to:
       display a three-dimensional (3D) shape on the display device;
       generate a two-dimensional (2D) representation of a 3D drawing surface of the 3D shape based upon a geometry of the 3D drawing surface, the 3D drawing surface having an orientation that is independent of an orientation of the 3D shape;
       map the 2D representation to the drawing input device;
       obtain an input indicating a drawing stroke to be applied to the 3D drawing surface via the drawing input device;
       apply the drawing stroke to the displayed 3D shape by translating the drawing stroke applied to the 2D representation to the 3D shape according to the geometry of the 3D drawing surface; and
       generate a stereoscopic image pair according to the applied drawing stroke and depth information provided by the geometry of the 3D drawing surface of the 3D shape.

11. The system as recited in claim 10, wherein the 3D shape and the applied drawing stroke are displayed on the display device in stereoscopic form.

12. The system as recited in claim 10, wherein the system further comprises a direct manipulation device, and wherein the program instructions are further executable by the at least one processor to:
    obtain a position or an orientation input via the direct manipulation device, the position or the orientation input generated according to a position and an orientation of the direct manipulation input device; and
    in response to the position or the orientation input, modify at least one of the 3D shape's position or orientation in a virtual scene on the display device.

13. The system as recited in claim 10, wherein the program instructions are further executable by the at least one processor to:
    position a virtual light sources with respect to the 3D shape; and
    calculate shading characteristics of the 3D shape according to the virtual lights source; and
    wherein, the translating the drawing stroke comprises adjusting a brightness of the drawing stroke according to the shading characteristics of the 3D shape.

14. The system as recited in claim 10, wherein the program instructions are further executable by the at least one processor to store indications of portions of the 3D drawing surface to which the drawing stroke is applied, and wherein, to generate the stereoscopic image pair, the program instructions are executable by the at least one processor to render only the indicated portions of the drawing surface.

15. The system as recited in claim 10, wherein the program instructions are further executable by the at least one processor to create a depth map that indicates a depth of the 3D drawing surface generated from a geometry of the 3D drawing surface at a plurality of positions where the drawing stroke is applied, and wherein, to generate the stereoscopic image, the program instructions are executable by the at least one processor to render the drawing stroke according to the depth map.

16. A non-transitory computer-readable storage medium storing program instructions, wherein the program instructions are computer-executable to implement:
   orienting a three-dimensional (3D) shape that is displayed on a display device;
   orienting a 3D drawing surface on the 3D shape independently of orienting the 3D shape;
   generating a two-dimensional (2D) translation of the 3D drawing surface;
   mapping a geometry of the 2D translation to a drawing input device;
   obtaining an input indicating one or more drawing strokes to the 2D translation via the drawing input device;
   applying the one or more drawing strokes from the 2D translation to the 3D drawing surface according to the geometry of the 3D drawing surface; and
   generating a stereoscopic image pair according to the one or more applied drawing strokes and depth information provided by the geometry of the 3D drawing surface of the 3D shape.

17. The non-transitory computer-readable storage medium as recited in claim 16, wherein the program instructions are further computer-executable to implement modifying at least one of the 3D shape's position or orientation in a virtual scene on the display device in response to a position or an orientation input generated according to a position and an orientation of a direct manipulation input device.

18. The non-transitory computer-readable storage medium as recited in claim 16, wherein the program instructions are further computer-executable to implement:
   positioning one or more virtual lights sources with respect to the 3D shape; and
   calculating shading characteristics of the 3D shape on the 3D drawing surface according to the one or more virtual lights sources; and
   wherein to apply the one or more drawing strokes to the 3D drawing surface, the program instructions are executable to implement modifying brightness of the drawing strokes according to the shading characteristics of the 3D shape on the 3D drawing surface.

19. The non-transitory computer-readable storage medium as recited in claim 16, wherein the program instructions are further computer-executable to implement storing indications of portions of the 3D drawing surface to which the one or more drawing strokes are applied, and wherein, in said generating the stereoscopic image pair, the program instructions are computer-executable to implement rendering only the indicated portions of the 3D drawing surface.

20. The non-transitory computer-readable storage medium of claim 16, wherein the program instructions are further computer-executable to implement creating a depth map that indicates a depth of the 3D drawing surface at positions where the one or more drawing strokes are applied to the 2D translation, and wherein, in said generating a stereoscopic image pair, the program instructions are computer executable to implement rendering the one or more applied drawing strokes according to the depth map.

* * * * *

UNITED STATES PATENT AND TRADEMARK OFFICE
CERTIFICATE OF CORRECTION

| | | |
|---|---|---|
| PATENT NO. | : 9,202,309 B2 | Page 1 of 1 |
| APPLICATION NO. | : 13/562630 | |
| DATED | : December 1, 2015 | |
| INVENTOR(S) | : Winnemoeller et al. | |

It is certified that error appears in the above-identified patent and that said Letters Patent is hereby corrected as shown below:

In the Claims

Column 17, Line 61, after "...to the virtual light", delete "sources", insert -- source --, therefor.

Column 18, Line 50, after "...position a virtual light", delete "sources", insert -- source --, therefor.

Column 18, Line 53, after "...to the virtual", delete "lights", insert -- light --, therefor.

Signed and Sealed this
Nineteenth Day of April, 2016

Michelle K. Lee
*Director of the United States Patent and Trademark Office*